Nov. 5, 1940.　　　F. A. CARPENTER　　　2,220,209
AUTOMATIC WATER SYSTEM
Filed Sept. 30, 1938

Inventor
Fred A. Carpenter
By Philip A. Truedell
Attorney.

Patented Nov. 5, 1940

2,220,209

UNITED STATES PATENT OFFICE 2,220,209

AUTOMATIC WATER SYSTEM

Fred A. Carpenter, Berkeley, Calif.

Application September 30, 1938, Serial No. 232,642

3 Claims. (Cl. 103—6)

This invention, an automatic water system, relates to a method of, and means for maintaining the air volume constant in the pressure or storage tank, irrespective of minor leakage, or absorption of air within the tank by the water, and automatically compensates for any air which may be delivered by the supply pump, and thereby provides uniform operating conditions as to the expansive pressures under which water is delivered from the tank.

The system is entirely automatic in operation, and is operated once for each cycle of operations of the water supply pump, through the medium of the suction or vacuum created in the pump suction line at starting, for intake of air, and through the medium of the water hammer, or stabilizing of the water pressure in the tank and suction line as the pump is stopped, for injecting the air into the water supply tank.

The system cannot operate to air-bind the pump, and requires no additional source of power for its operation, and delivers air to the tank only until such time as a predetermined volume is attained, after which the injector becomes inoperative and delivery of air is discontinued to the tank until such time as the volume of air in the tank again decreases to a predetermined value, at which time the injector again becomes operative.

The main object of the invention is to provide a method of maintaining a constant volume of air in the tank as related to the termination of each cycle of operations of the pumping system, by replenishing the supply to compensate for slight leakages, or absorption of air by the water in the tank, and to carry out the method through the medium of variations in pressure set up in the suction line of the pumping system which delivers water to the tank.

Another object of the invention is to provide an injector operated through the medium of alternate suction and pressure created in the suction line of the supply pump respectively coincident with starting and stopping of the pump for replenishing the supply of water in the tank.

A further object of the invention is to provide an injector or pump as previously outlined which will become inoperative for the injection of additional air when the volume of air in the tank has exceeded a predetermined value.

A still further object of the invention is to provide a system as outlined in which air binding of the supply pump cannot occur through its influence, with the supply pump functioning to actuate the injector.

In describing the invention, reference will be had to the accompanying drawing forming a part of this specification, in which.

Figure 3:
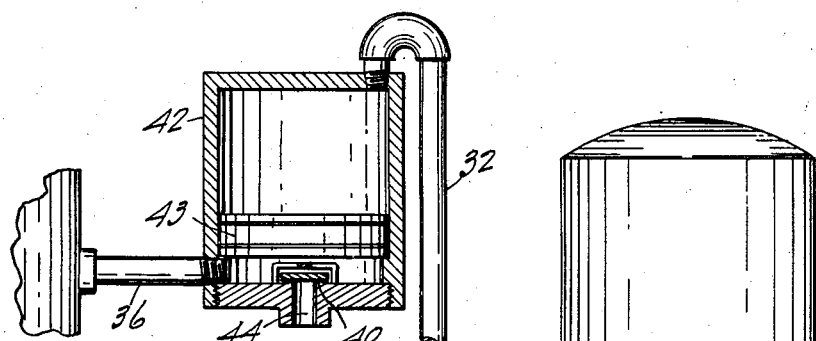
Fig. 3 illustrates a modified form of injector.
Figure 1:
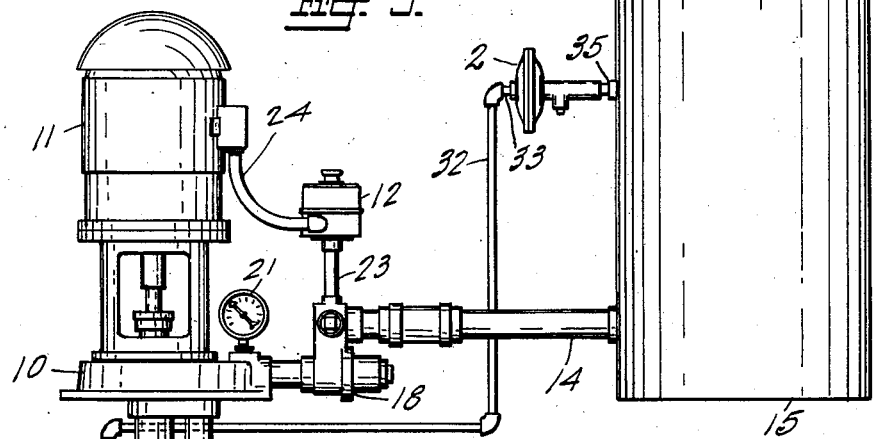
Fig. 1 is a front elevation of the invention, illustrating its associated elements and their relation to each other.

The usual automatic water system consists of a pump 10 with its associated driving means 11 which is controlled for operation by a pressure switch 12, the pump having a suction line 13 which varies in structure according to the conditions of operation and the type of pump used; and a connection 14 communicates between the pump 10 and a supply or storage tank 15, the pressure in this tank effecting control of the pressure switch 12 for operation when the tank pressure drops to a predetermined minimum value, and for discontinuance of operation when the pressure in the tank has risen to a predetermined maximum value, the pump and its control 12 functioning to maintain the pressure in the tank within certain prescribed limits.

The tank 15 is airtight and entraps the air in the upper part where it is compressed by the water pumped into the tank to form an expansive volume of air for delivery of water under pressure. The greater the compressed volume of air, the more uniform will be the delivery pressure between high and low water levels in the tank. If the volume is maintained substantially constant as related to the established pressure, the delivery pressures will be uniform.

The pump illustrated is of the centrifugal type, and the suction line is provided with a booster in the form of a venturi 16 through which a predetermined amount of water is forced by the jet 17 during pumping, the water being diverted by the pressure control valve 18 through the jet 17 to convert energy in the form of high pressure water into velocity to create a partial vacuum in the foot 19 to draw water past the foot valve 20. This jet also functions to prime the suction line to capacity each time the pump is stopped, and thus associates and equalizes the pressure in the tank 15 with that in the suction line 13, during idle periods between pumping operations; these features having important bearing on the successful operation of the invention. The gauge 21 indicates the existent pressure in the system.

The valve 18 automatically diverts the correct amount of water to the jet 17 to compensate for variations in rise and fall of the water source level 22, and increases its opening as the tank pressure increases, permitting greater freedom of flow as the pump reaction increases in value.

The switch 12 is in direct communication with the tank 15 through the pipe 23, valve 18 and connection 14, and the electrical connections are carried through the conduit 24.

The invention consists of a method of maintaining the volume of air in the tank 15 constant as related to an established maximum pressure, whereby uniformity in expansive characteristics of the cushioning air above the water level is assured; and the invention also includes the structures and combinations necessary for carrying out the method.

The structure in its preferred form consists of a diaphragm pump or injector 2 and its associated elements and connections, which operate in combination with the elements previously mentioned or suitable substitutes therefor, and the injector is actuated through the medium of variations in pressure set up in the suction line 13 and is directly associated therewith, and is controlled for operation by the level 25 of the water 26 in the tank 15.

The injector consists of a housing comprising two half housings or heads 27 and 28 having a diaphragm 29 clamped therebetween dividing the housing into two compartments, respectively, an operating compartment 30 and a discharge compartment 31, and the diaphragm is preferably normally urged to its discharged position illustrated.

A tube or connection 32 has one of its ends 33 in communication with the operating compartment of the injector and its other end 34 in communication with the suction line 13 at a point where the vacuum created by the pump during pumping is of the highest value.

The other, or discharge compartment 31 is connected to the supply tank 15 at a point 35 coinciding with the established maximum level at which the supply of water in the tank is to be carried with each pumping operation, and the connection is made through a connection 36 which is provided with a water-sealable valve which will effectively seal against escape of water under pressure from the tank to the discharge compartment of the injector, yet which will be ineffective to efficiently seal against air under pressure from the tank unless the valve is flooded with water, and thereby permit the air under pressure to leak or bleed into the discharge chamber when the water is below its maximum established level.

The valve illustrated to accomplish this purpose consists of a metal ball 37 which is seated on a metal seat 38 and shown with a very light spring 39 to keep the ball to its seat, although it is preferred to omit the spring and depend upon the rush of water to seat it following injection of air.

An intake valve is also provided and consists of a rubber disc 40 which is seated on a suitable annular seat 41 and operating to open under suction created in the discharge compartment of the injector to admit free air to the compartment, and seal against the escape of air.

A modification of the injector is illustrated in Fig. 3 and consists of a cylinder 42 having a piston 43 operating therein, the connection 32 being connected to the top of the cylinder, and the connection 36 connecting the bottom of the cylinder with the tank 15 at the point 35. The piston forms means for isolating the suction line 13 from the port 44 and tank 15, and may operate through its own weight, or may be spring urged in the manner shown for the diaphragm, Fig. 2.

Figure 2:
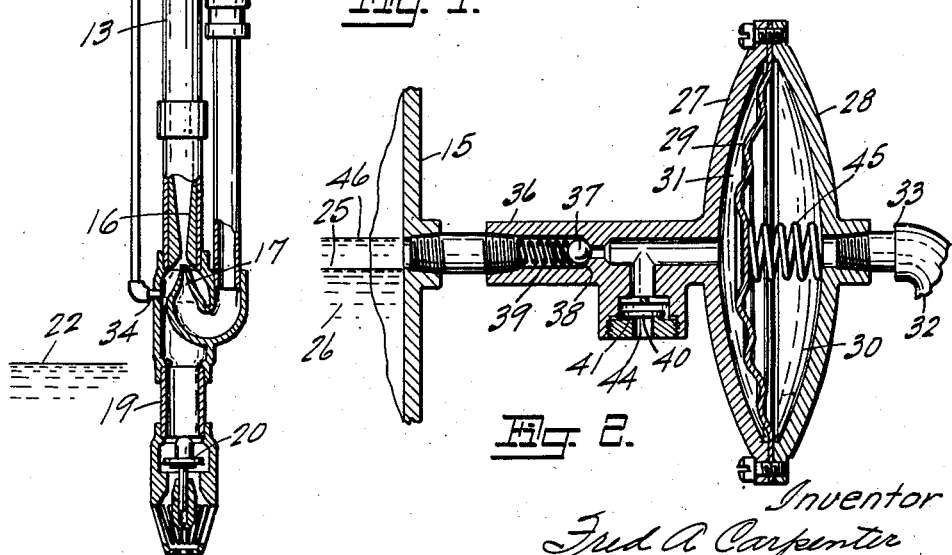
Fig. 2 is a sectional elevation through the injector in its preferred form.

The connection 36 includes the water-sealable check valve illustrated in Fig. 2, and the intake valve 40 may be installed in the connection as shown in Fig. 2, or one of suitable construction may be located in the lower end of the cylinder 42 as illustrated in Fig. 3, the intake port in both views being shown at 44.

The operation of the system is as follows: The pressure in tank 15 drops to the established low value which permits the pressure switch 12 to close circuit to motor 11 which drives the pump 10 wich creates a suction or partial vacuum in the suction line 13, and a portion of the discharge from the pump is diverted by the valve 18 to the jet 17 which discharges through the venturi 16, creating a suction in the foot section 19 of the suction line as well as throughout the height of the line, drawing in water from the water source 22 past the foot valve 20.

The suction created by the pump 10 and jet 17 is transmitted through the connection 32 to the operating chamber 30 of the injector, and through the vacuum created, the diaphragm is drawn back against the urgence of spring 45 and creates a displacement in the discharge compartment 31, causing air to be drawn in past the valve 40 to fill the compartment 31. The diaphragm is maintained in this retracted position until the pump 10 has built up the pressure in the tank 15 to its established maximum, at which time the circuit is broken to the motor by means of the pressure switch 12, and the operation of the pump is thereby terminated.

Coincident with stopping of the pump there is a surge of water from tank 15 through valve 18 and nozzle 17 to suction line 13, establishing a communicating pressure between the tank 15 and the suction line 13 completely filling the suction line and pump with water from, and urged by the pressure within the tank, and this reversal from a condition of suction to one of pressure creates a single impulse water hammer which is transmitted through the connection 32 to the operating compartment 30, driving the diaphragm forward and forcing the air from the discharge chamber into the tank 15 past the valve 38. Following this surge, the pressure in the tank 15, suction line 13, connection 32 and chamber 30 become equalized and remain so until the pump is again started.

The spring 45 augments the power, and will function to force the air into the tank, even in the event of mere equalization of pressure, since the unit pressure on the back of the diaphragm and on the valve 37 is then equalized, and therefore very little tension is required in the spring 45 to force the air into the tank.

This injection occurs at the conclusion of each cycle of operation or water replenishment, and will be repeated with each cycle until the volume of air in the tank has attained a predetermined value as related to the established maximum pressure, and this injection is controlled by the water level in the tank. No injection can occur except at the time the pump is stopped.

With each injection, the volume of air in the tank is increased, depressing the maximum water level until it reaches the established level, as indicated at 25, at which point the air in the tank is in direct communication with the valve 38, and as there is no water for effectively sealing this valve against the air under pressure within the tank, the air will leak or bleed past the valve, filling the restricted discharge compartment 31 with air under pressure, and, as the diaphragm is drawn back by suction when the pump is started, this air under pressure expands to fill the increased volume of chamber 31, thus permitting no intake of additional air through the port 44 when the pump is started, and the injector is thereby rendered ineffective until such time as air either leaks from the tank or is absorbed by the water therein to reduce the effective volume of air and thus raise the water level under the established maximum pressure, to a higher level, as indicated at 46, under which conditions the valve 38 will again be water-sealed and the air discharged will again remain in the tank, and operation of the injector will be resumed to again depress the water level. Since there is always a sufficient period of time elapsing between stops and starts of the pump, a very slow leakage of air past valve 37 is completely effective to make the injector inoperative. Obviously, this valve will be operative only in such positions in which it has complete drainage back to the tank, and when not provided with a spring, as is preferred, it can only be used with its axis in a horizontal plane.

The injectors shown in Figs. 2 and 3 obviate any possibility of delivery of air therefrom to the suction line and thus cannot operate to effect air binding of the pump.

The modification shown in Fig. 3 operates in the same manner as that in Fig. 2, except that instead of the diaphragm 29 being retracted, the piston 43 is raised, by suction.

It will be understood that variations in construction and arrangement of parts, and variations in the method, which variations are consistent with the appended claims, may be resorted to, without detracting from the spirit or scope of the invention, or sacrificing any of the advantages thereof.

I claim:

1. In an automatic water supply system having a storage tank, a pump having an inlet, and driving means for driving said pump; and a suction line connected to the pump inlet and having a foot valve; a discharge connection from said pump to said tank; a communicating connection between said tank and said suction line associating and equalizing the pressure in the tank with that in the suction line when the pump is inoperative: an injector comprising a housing; a diaphragm dividing said housing into two compartments with the diaphragm on one face and its compartment subject to variations in pressure created in said suction line respectively at starting and stopping of the pump; an intake port and a valve therefor for the other compartment; a discharge connection between said other compartment and said tank and connected at a predetermined level; and a water sealable valve sealing against water while permitting bleeding of air from said tank to said other compartment when said valve is free of water; said valve being associated with said discharge connection and normally closed against pressure within the tank, whereby, suction in said suction line at starting and during running of the pump causes a single retraction of said diaphragm to take a charge of free air into said other compartment, and stopping of said pump through said equalizing means creates a pressure to urge said diaphragm to inject said charge of free air into said tank, and recession of the water level due to abnormal supply of air bleeds air under pressure from the tank to fill the other compartment for expansion when the next retraction of said diaphragm is effected to make ineffective the intake movement of said diaphragm to take in a new charge of air.

2. A structure as claimed in claim 1 in which a spring is associated with said diaphragm to augment the pressure on said one face for discharge of the air from the other compartment into said tank.

3. In combination with a pressure tank; means establishing and maintaining a constant level of water in said pressure tank as related to a predetermined pressure attained in the tank at the conclusion of a pumping operation, comprising; a pump for delivering water to said tank and having a suction line and a foot valve and means equalizing the pressure in said tank and said suction line when said pump is not operating; an air injector having a piston forming an air compartment and a power compartment; a free air inlet for said air compartment and a valve therefor; a communicating connection between said power compartment and said suction line; a communicating connection between said air compartment and said tank and located intermediate the height of the tank and projecting with its axis horizontal for drainage of water back to said tank; a valve seat formed on said horizontal axis in said connection to said tank and a ball normally seated on said seat and urged to seat by the water under pressure within the tank and being free to leave said seat when not influenced by said water under pressure; said ball, when seated on said seat effectively sealing against escape of water from said tank when in the presence of water while permitting escape of air from said tank into said air compartment in the absence of water for sealing, for expansion in said air compartment when said piston is retracted through suction created upon starting and throughout the entire period of operation of the pump, and thereby preventing intake of free air into said air compartment and making said injector inoperative.

FRED A. CARPENTER.